Nov. 1, 1932.  A. E. CHURCH  1,886,083
CHUCK
Filed Jan. 2, 1931    2 Sheets-Sheet 1

Witness
E. Hunt.

Inventor
A. E. Church.
By H. B. Willson & Co.
Attorneys.

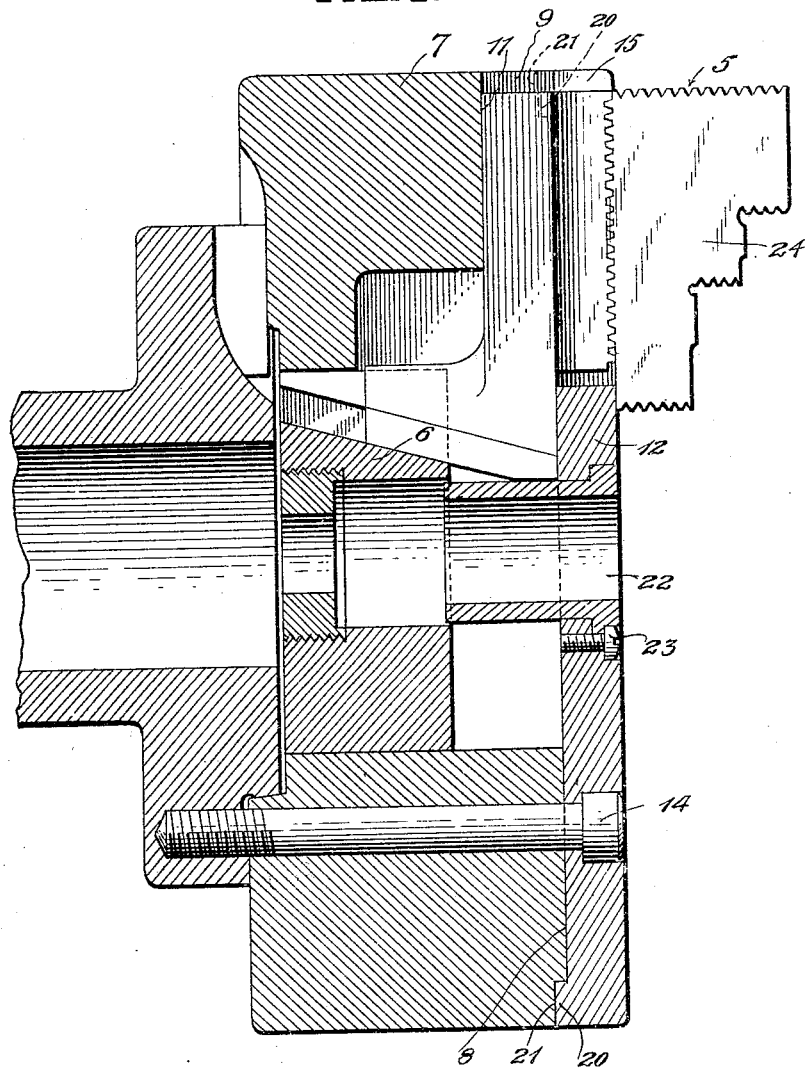

Patented Nov. 1, 1932

1,886,083

UNITED STATES PATENT OFFICE

ALBERT E. CHURCH, OF NEW BRITAIN, CONNECTICUT, ASSIGNOR TO THE UNION MANUFACTURING COMPANY, OF NEW BRITAIN, CONNECTICUT, A CORPORATION OF CONNECTICUT

CHUCK

Application filed January 2, 1931. Serial No. 506,265.

The invention relates to chucks for metal lathes and the like. Such chucks or other holding devices are provided with jaws to engage and drive the work, and due to the tremendous strain which the chuck bodies must encounter to hold the jaws with a driving grip upon the work, particularly when heavy cuts are being made with the high speed steel of today, said bodies are subject to severe distortion, and moreover, their jaw guides are subject to great wear. It is the object of my invention however, to provide an improved construction in which distortion of the chuck body or head is resisted to the maximum and in which the jaw guides are so formed as to allow easy reconditioning thereof when sufficient wear has occurred to loosen the jaws in said guides.

With the foregoing in view, the invention resides in the novel subject matter hereinafter described and claimed, description being accomplished by reference to the accompanying drawings.

Fig. 3 is a vertical sectional view on line 3—3 of Fig. 1.

Figure 1:
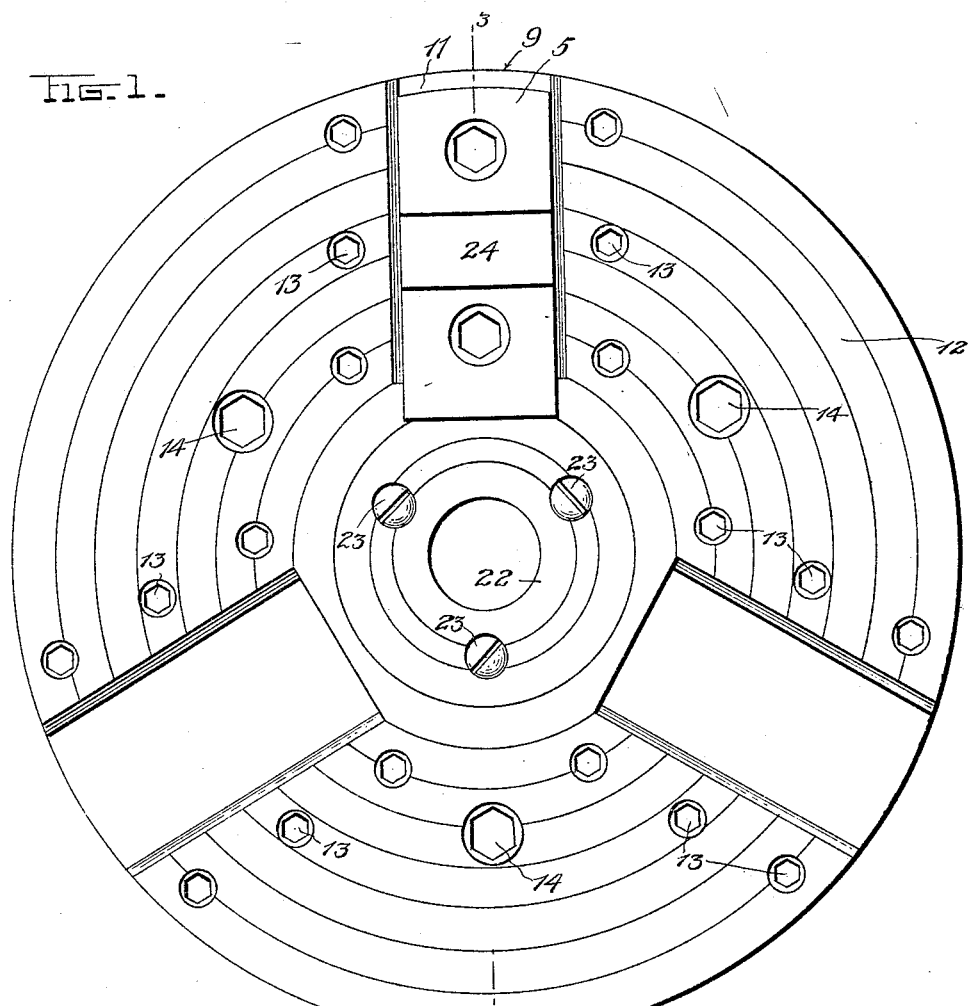
Fig. 1 is a face view of a chuck constructed in accordance with the invention, two jaws being omitted.
Figure 2:
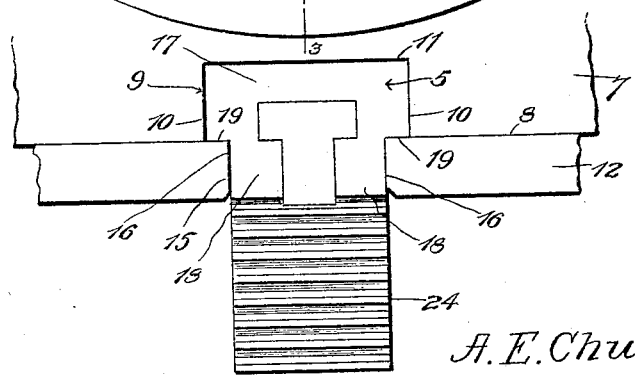
Fig. 2 is a fragmentary edge view.

A chuck is shown embodying radially movable jaws 5 which may be slid inwardly and outwardly by means of a slidable wedge 6 constructed and operated in any preferred way. It is to be understood however that the invention is not restricted to chucks operated by wedges, but is adaptable equally well to those embodying any of various jaw-operating means, such as those now commonly used.

The chuck head 7 may be of cylindrical form and is provided with a flat front face 8, and with radial grooves 9 opening through said front face. In the preferred construction, opposite sides 10 of each groove 9 are strictly parallel and at right angles to the face 8, and the inner side 11 of each groove is flat and at right angles to said sides 10.

Lying against the face 8, is a flat, one-piece strain-resisting plate 12 of heavy form, said plate being preferably of hardened steel to possess maximum strength. This plate is rigidly, yet removably secured against the face 8 by screws or the like 13 and 14, and said plate is provided with radial slots 15 which register with the grooves 9. The slots 15 are of considerably less width than the grooves 9, so that the portions 16 of the plate 12, along opposite edges of said slots 15, project inwardly beyond the opposed sides 10 of said grooves, in parallel relation with the inner groove sides 11.

The jaws 5 are provided with relatively wide inner portions 17 which are snugly received in the grooves 9, and said jaws also embody relatively narrow outer portions 18 slidably received in the slots 15. At the juncture of the portions 17 and 18, flat shoulders 19 are provided, said shoulders being in contact with the projecting portions 16 of the plate 12. Hence, these plate portions hold the jaws 5 snugly against the inner sides 11 of the grooves 9 and the jaws become substantially rigid with respect to the chuck head, although they may of course be radially adjusted.

Whenever sufficient wear of the shoulders 19 has taken place to loosen the jaws 5 within their guides, the plate 12 and the jaws may be removed from the chuck head. Then, the face 8 of said chuck head may be faced off an amount equivalent to the wear, the shoulders 19 being also re-dressed if necessary. Then, when plate and jaws are again restored to their proper positions and said plate is again secured in place, the jaws will again be tightly though slidably held against the inner sides 11 of the grooves. Hence, by the simple procedure described, the chuck may be so reconditioned as to be as efficient as it was prior to the wear which caused loosening of its jaws.

Another advantage for the structure shown, is that the heavy hardened plate 12 itself resists wear. Moreover, this plate being rigidly secured to the head 7, resists distortion of the latter under the strains which it encounters during operation of the chuck, providing a structure of indefinite life, instead of one which is necessarily short-lived, as in the past.

To assist the plate 12 in holding the head 7 against radial expansion under strain, said plate and head are provided with co-acting means establishing a peripheral interlock between them. In the present showing, plate 12 is provided with a peripheral rib 20 snugly received in a peripheral groove 21 formed in the face 8 of the head 7, said rib and groove providing abutting shoulders.

Preferably, the plate 12 carries a bushing 22 for the conventional pilot bar. This bushing may be secured in place by screws 23 or in any other preferred way.

By providing the novel construction shown and described, a greatly improved chuck is provided, in which distortion under strain is restricted to an extreme minimum and in which effective provision is made for allowing reconditioning of the jaw guides when they become worn. As the details disclosed may be considered as preferred, they may well be followed. However, it is to be understood that within the scope of the invention as claimed, minor variations may be made. Moreover, while the jaws 5 are shown as embodying separate, stepped adjustable, outer portions 24, it is to be understood that the invention is not restricted to any jaw details except those requisite to insure proper mounting of the jaws in their guides.

I claim:—

1. In a slidable jaw chuck, a head having radial grooves through its front face, said head being provided near the peripheral edge of said face with a shoulder facing toward the periphery of the head, a heavy one-piece plate secured against said face of said head, said plate having an inwardly facing shoulder abutting the aforesaid shoulder and having radial slots narrower than and registering with said grooves, said plate having sufficient resistance to radial expansion to counteract the weakening effect of said slots and hold said head against radial expansion under strain, and jaws passing slidably through said slots and held in slidable contact with walls of said grooves by means of the portions of said plate along said slots.

2. A structure as specified in claim 1; said plate having a central opening, and a pilot bar bushing secured in said opening.

In testimony whereof I affix my signature.

ALBERT E. CHURCH.